United States Patent [19]

Leblanc et al.

[11] Patent Number: 4,986,600
[45] Date of Patent: Jan. 22, 1991

[54] COLLAPSIBLE INFANT SEAT

[76] Inventors: Roland Leblanc, 288 Chemin Calumet, Bryson, Quebec, Canada, J0X 1H0; Gaetan Boutin, deceased, late of Bryson, Canada, by Sylvie Tessier, executor

[21] Appl. No.: 229,409

[22] Filed: Aug. 8, 1988

[30] Foreign Application Priority Data

Aug. 7, 1987 [CA] Canada .................................. 544032

[51] Int. Cl.⁵ ............................................... B60N 1/12
[52] U.S. Cl. ................................... 297/238; 297/488; 297/112
[58] Field of Search .............................. 297/112–114, 297/238, 256, 487, 488

[56] References Cited

U.S. PATENT DOCUMENTS

| | | |
|---|---|---|
| 1,034,678 | 8/1912 | Berger et al. . |
| 1,253,241 | 1/1918 | Haussinger . |
| 1,347,127 | 7/1920 | Singleterry . |
| 1,559,425 | 10/1925 | Hehn . |
| 2,337,480 | 12/1943 | Logan . |
| 2,436,294 | 2/1948 | Glatstein . |
| 2,584,481 | 2/1952 | Mast et al. . |
| 2,751,961 | 6/1956 | Sitterley ............................ 297/256 |
| 3,094,354 | 6/1963 | Bernier . |
| 3,193,326 | 7/1965 | Smith . |
| 3,404,917 | 10/1968 | Smith . |
| 4,230,366 | 10/1980 | Ruda ................. 297/238 X |
| 4,456,302 | 6/1984 | Knoedler et al. ................. 297/488 |
| 4,533,176 | 8/1985 | Wytlenbach ................. 297/14 X |
| 4,540,216 | 9/1985 | Hassel Sr. ........................ 297/238 |
| 4,596,420 | 6/1986 | Vardya ................. 297/238 X |
| 4,664,443 | 5/1987 | Casale ................. 297/238 |
| 4,756,573 | 7/1988 | Simia et al. ................. 297/238 X |

FOREIGN PATENT DOCUMENTS 782872 4/1968 Canada .

Primary Examiner—Peter R. Brown
Attorney, Agent, or Firm—Sughrue, Mion, Zinn, Macpeak & Seas

[57] ABSTRACT

There is described a new and improved collapsible infant seat formed as part of a vehicle seat, the vehicle seat including a bench and an upright back, the collapsible seat including a seat portion connected at one end to the vehicle to be pivotable between an open position overlying the bench portion of the vehicle seat, and a closed position forming a lower part of the upright seat back, a seat back extending upwardly from the rearward edge of the seat portion, a pivotable bracket including a padded child restraint, a fastener for securing the seat in an open position and a harness for restraining the child within the seat.

7 Claims, 3 Drawing Sheets

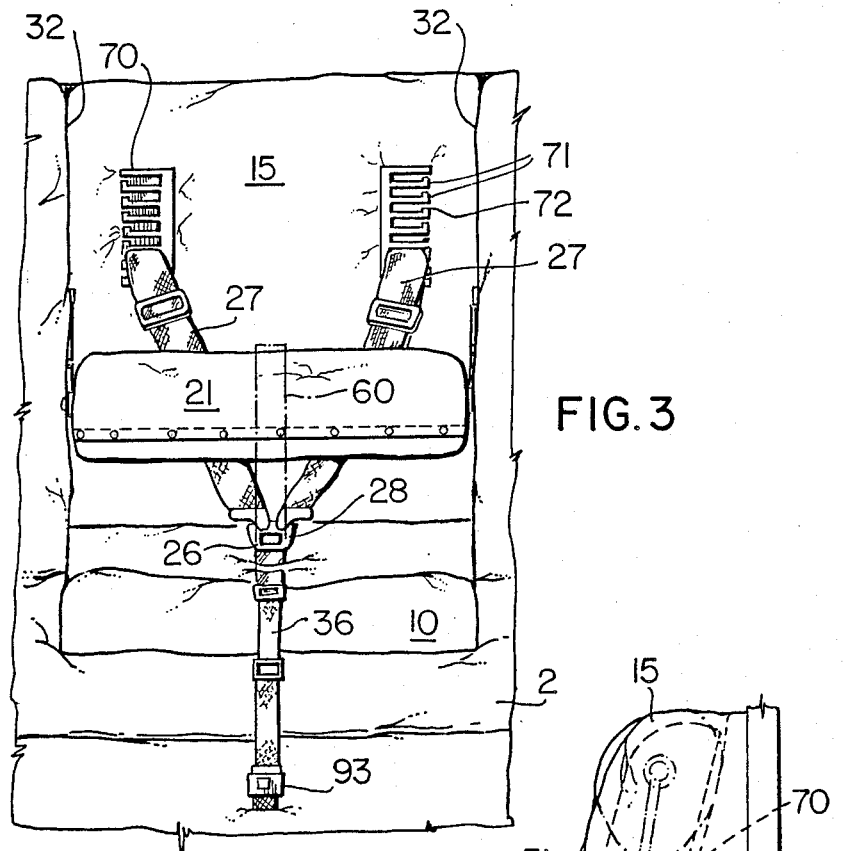
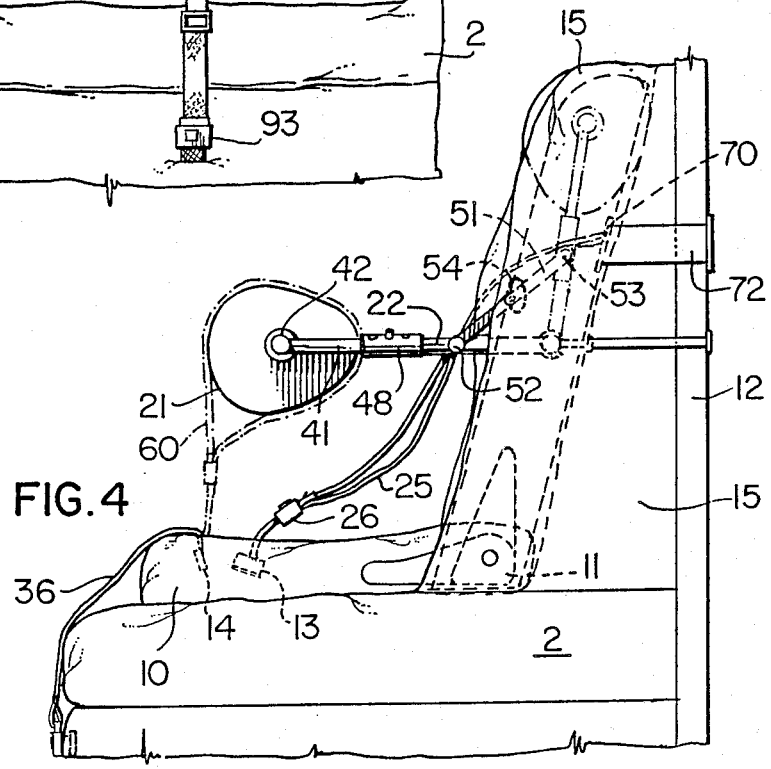

COLLAPSIBLE INFANT SEAT

FIELD OF THE INVENTION

The present invention relates to a vehicle seat and more particularly to a collapsible infant safety seat of the sort used in vehicles.

BACKGROUND OF THE INVENTION

Infant safety seats are of course well known and have been in use for many years for the purpose of protecting youngsters travelling in cars. Typically, such seats include a rigid framework for supporting the seat portion and protecting the child, and a harness system used to strap the child securely within the seat in the event of an accident. Virtually all commercially available seats of this sort are sold as stand-alone units which are removably installed using the car's seat belt to restrain the lower portion of the seat, and a strap with a hook or similar mechanism for anchoring the top of the seat to the vehicle frame.

The problem with such seats is of course that they are intrusive and occupy seat space even when not in use to transport children. Larger persons using the back seat of the vehicle which is where infant seats are usually installed must crowd around the safety seat, or the seat must be removed to accommodate extra passengers. Removal can be an awkward and time consuming process. Obviously, when the seat is again required, it must of course be reinstalled, which can be equally awkward.

SUMMARY OF THE INVENTION

An object of the present invention is to provide a "built-in" safety seat that can be conveniently deployed or folded away without the necessity of physically removing the seat from the vehicle. In a preferred embodiment, the collapsible seat as will be described herein actually forms part of the vehicle seat when not being used to transport a child.

According to the present invention, then, there is provided a collapsible infant seat formed as part of a vehicle seat, the vehicle seat including a bench portion and an upright back, the collapsible seat comprising a seat portion connected at one end thereof to be pivotable between an open position overlying the bench portion and a closed position forming a lower part of the upright back, a back portion comprising a padded surface of the upright back of the vehicle seat, bracket means pivotally connected to the vehicle to support a padded restraint for movement between a child restraining position above the seat portion and a closed position forming an upper part of the upright back, fastening means for securing the seat portion in the open position thereof, and harness means extending between the seat portion and the back portion for strapping in the occupant of the collapsible seat.

BRIEF DESCRIPTION OF THE DRAWINGS

Embodiments of the present invention will now be described in greater detail and will be better understood when read in conjunction with the following drawings in which:

FIG. 3 is a front elevational view of the collapsible seat in a folded down condition;

FIG. 4 is a side elevational view of the seat shown in FIG. 1;

DETAILED DESCRIPTION OF PREFERRED EMBODIMENTS

Figure 1:
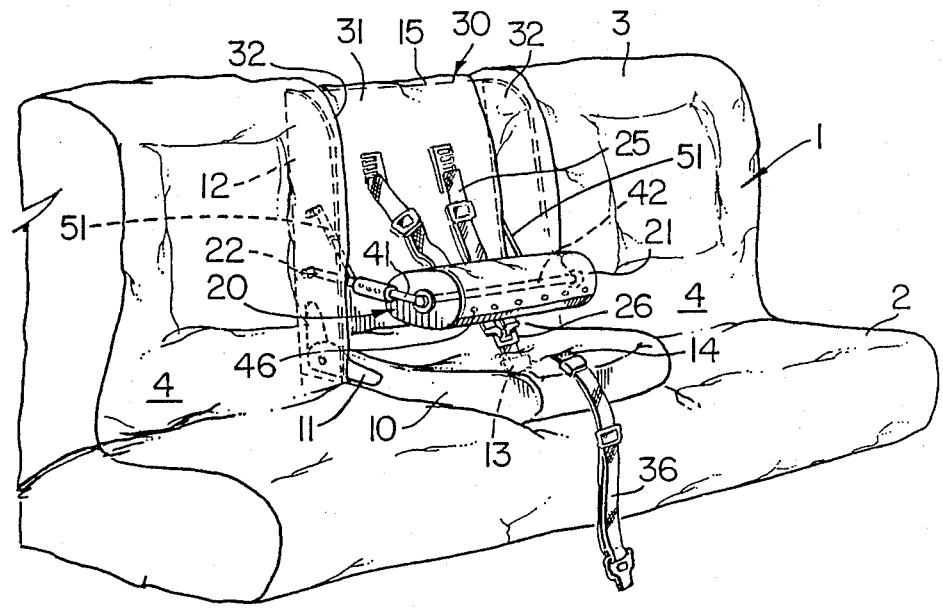
FIG. 1 is a perspective view of the collapsible infant seat in accordance with the present invention.

With reference to FIG. 1, the collapsible infant seat in accordance with the present invention is shown in a folded down, ready for use condition. The seat as shown is installed in the center of the rear seat 1 of a vehicle, although the seat could be installed to either side or even on both sides thereof, and conceivably even in the front seat. Generally however, the rear seat is considered to be the safest location for infants, and the middle of the rear seat is generally regarded as the preferred location for maximum safety and protection. Moreover, the proximity of the vehicle frame behind the rear seat facilitates the installation of the collapsible seat as will be described below.

Rear seat 1 generally includes a bench 2 and an upright back 3 both of which are suitably padded and upholstered with a material such as cloth, vinyl or leather. With reference to FIG. 1, the present seat includes a pivotable padded and upholstered generally rectangular seat portion 10, a padded upright back portion 15, a padded pivotally mounted restraint mechanism 20 and a safety harness 25.

Rear seat 1 is formed with a recess 30 in the center thereof, the recess substantially corresponding in width and depth to the width and depth of seat portion 10. The recess is defined by seating surface 31 of back portion 15, and padded lateral side surfaces 32 defined by the edges of the adjacent seat back cushions 4. As will be appreciated, when the seat is in use, side surfaces 32 provide flanking protection for the child, and limit the extent to which the child may sway from side to side and serve as a comfortable place for the child's head when sleeping.

Seat portion 10 includes an inner framework (not shown) of any suitable configuration to support the seat's padding and the upholstered surface, and also to provide an attachment for hinge assembly 11 which pivotally connects the seat to (FIG. 2) provided back portion 15. The inner framework also includes connecting points for a loop 13 for securing a buckle 26 for safety harness 25 and another loop 14 for a safety strap 36 which will be described in greater detail below, but which is used to secure seat portion 10 in the deployed condition overlying bench 2 as shown in FIG. 1.

The collapsible seat includes as aforesaid a padded safety restraint mechanism 20 including a padded cylindrical restraint 21, supported for pivotal movement on a bracket 22. Bracket 22 includes a pair of arms 41 and a transverse crossbar 42 about which restraint 21 is preferably removably provided such as by means of dome fasteners 46. As will be appreciated, restraint 21 is bound to pick up a number of foreign substances and will probably require removal for periodic cleaning.

Figure 2:
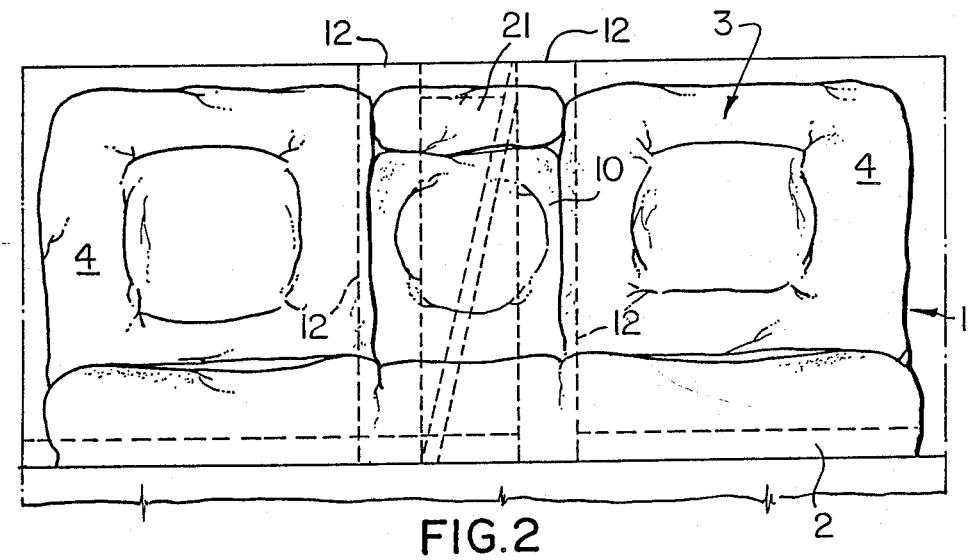
FIG. 2 is a front elevational view of the seat of a vehicle including the collapsible seat in a folded away condition.

Brackets 22 are pivotally connected to reinforced flanges 12 behind upright seat back 3 so that the bracket with restraint 21 attached can move between the deployed condition shown in FIG. 1 where the restraint is held a predetermined distance above seat portion 10, and a closed or folded away position shown in FIG. 2. In the closed position, restraint 21 forms an upper portion of seat back 3 in the nature of a headrest.

As will be seen most clearly from FIG. 4, brackets 22 include couplers 48 which permit the arms to be lengthened to accommodate the size of the child as he/she grows.

To hold brackets 22 in a predetermined horizontal position, a variety of different mechanisms may be used including a flexible, inelastic cord extending between a point intermediate along the lengths of the arms and diagonally upwards and rearwards for connection to reinforced flanges 12 provided on the vehicle framework behind the rear seat, or adjustable straps or the plastic coated metal braces 51 shown in the drawings. The metal braces are pivotally connected at ends 52 thereof to brackets 22 and at the other ends 53 thereof to surfaces 32. Preferably, the braces are attached to the brackets 22 behind couplers 48, that is, on the side thereof closest to back portion 15 so that the length of the braces need not be adjusted to compensate for adjustments to the lengths of the brackets. Braces 51 each include a flexible knuckle 54 which can be locked to fixedly maintain brackets 22 in a horizontal position. An additional strap 60 attached at the lower end thereof to loop 14 and which wraps around padded restraint 21 may be installed to prevent the inadvertent lifting of the restraint.

Safety harness 25 is of conventional design such as those used in existing safety seats.

With reference to FIG. 3, the harness includes adjustable shoulder straps 27 which are separately attached to an eyelet 28 forming part of buckle 26. The upper ends of each shoulder strap either pass through seat back 15 for connection to flanges 12 behind back portion 15, or to special cleats 70 provided on back portion 15 for this purpose. Each cleat 70 is rigidly connected in turn to flanges 12 in any suitable fashion such as by means of tabs 72 seen most clearly in FIG. 4. Each cleat is comb-like in construction including a plurality of tines 71 formed with upturned flanges 72 to prevent the ends of the shoulder straps from sliding off. As will be obvious, the straps are attached to the tines at the level best suited to the size of the child so that as the child grows, successively higher tines are used.

As mentioned, safety strap 36 is used to maintain seat portion 10 in the folded down position shown in FIG. 3. The strap may be adjustable in length, and includes at its outer end a buckle or hook for engaging a clasp 93 securely fastened to the vehicle frame beneath bench 2.

As will also be seen most clearly from FIG. 3, seat portion 10 may be contoured slightly to provide a better form fit to the child for greater comfort and lateral support.

Figure 5:
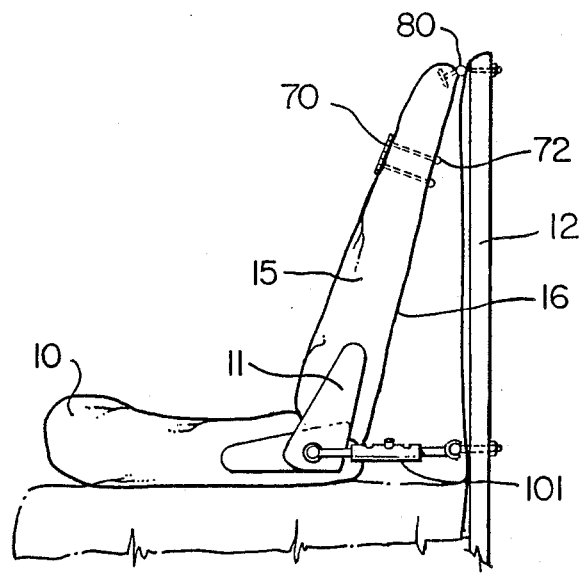
FIG. 5 is a side elevational view of a modified embodiment of the seat shown in FIG. 1.

In another embodiment contemplated by the applicant shown in FIG. 5, extensible rods 101 are connected between hinge assembly 11 and flanges 12 to permit seat 10 to be moved back and forth. This in turn permits adjustments to the angle of seat back 15. In this embodiment, seat back 15 includes a rigid reinforced rear surface 16 to provide greater strength and protection and to serve as an anchor for tabs 72 supporting cleats 70.

Figure 6:
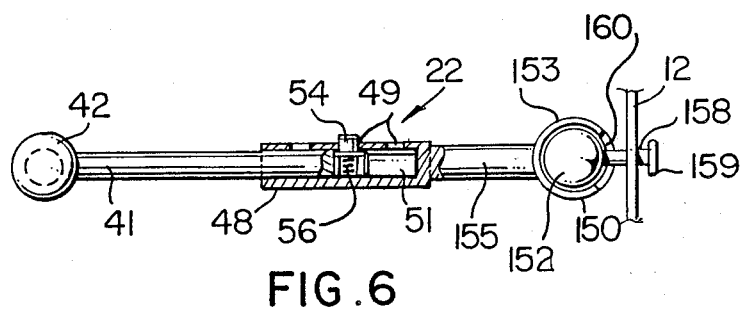
FIG. 6 a partially cross-sectional, side elevational view of a pivotable bracket forming part of the present seat.

The construction of brackets 22 and extensible connecting rods 101, and their method of attachment to reinforcing flanges 12 may be essentially the same and will be seen most clearly with reference to FIG. 6, which shows a partially cross-sectional view of bracket 22 only. It will be understood however that the following description of the bracket applies equally to connecting rods 11 and 101.

Each bracket 22 is connected to reinforcing frame member 12 by means of, for example, a ball joint 150. The joint consists of a ball 152 rotatably received within a spherical socket 153 formed at one end of a tubular member 155. A pin member or screw 158 with a flanged head 159 passes through frame member 12 into ball 152. At the other end of tubular member 155 opposite the ball joint, a coupler 48 is either threaded or formed in place, the coupler including a plurality of aligned apertures 49 and a cylindrical cavity 51 into which is received one end of arm 41 as shown in the drawing. The other end of arm 41 is connected to cross member 42 which supports padded restraint 21.

The end of arm 41 received into cylindrical cavity 51 includes a pin 54 biased into a radially outwardly extending position by means of a resilient spring 56, whereby the pin is normally received into one of apertures 49. To change the length of the bracket, pin 54 is depressed and arm 41 is moved either in or out to make the necessary adjustment to the bracket's length at which point the pin is released into the nearest adjacent aperture 49.

The bracket is obviously pivotable about ball 152 with pin 158 tracking along a slot 160 cut into the outer surface of spherical socket 153. A securing element 80 serves to fasten seat back 15 at its upper end to the vehicle frame.

As described above, the present collapsible seat may be folded away to form an integral part of the rear seat of the vehicle. It is not necessary however that seat portion 10 actually be recessed into seat back 3, but instead may simply fold up against the normal seating surface of the seat back. Obviously, the collapsible seat will be more obtrusive when not in use, but this arrangement may nevertheless be preferred in some situations.

Whether the collapsible seat is recessed into the vehicle seat itself, or simply folds up against the upright back of the seat, the seat may be upholstered in the same fabric as the vehicle seats to provide a more pleasing appearance.

We claim:

1. A collapsible child's seat formed as part of a vehicle bench seat, said vehicle bench seat including a bench portion and an upright back, said collapsible child's seat comprising:

a seat portion formed as a separate contoured padded slab connected at the lower end thereof to said upright back of said bench seat to be pivotable between a closed position, in which said seat portion forms a lower and a middle portion of said upright back of said bench seat and is flush with the remainder of said upright back, and an open position overlying said bench portion;

said lower and middle portions of said upright back of said bench seat being formed with a recess therein to receive said child's seat portion when in the closed position, said recess having a width and depth substantially corresponding to the width and depth, respectively, of said child's seat portion, a back portion and sidewalls of said child's seat being fixed and being defined by respective side surfaces and a back surface of said recess;

said back portion and said sidewalls of said child's seat being formed by the contour of said recess of said upright back when said child's seat portion overlays said bench portion;

a U-shaped, pivotable, padded restraint means;

bracket means disposed on either side of, and approximately at the midpoint in height of, said recess and pivotally connected to the frame of said vehicle to support said U-shaped, pivotable, padded restraint means which forms an upper part of, and is flush with, said upright back when said restraint means is not engaged, and which extends outwardly at an angle of approximately 90 degrees from said upright back when engaged;

said U-shaped pivotable padded restraint means being vertically disposed over said child's seat, when engaged, to enclose an area above said child's seat to restrain movement of a child;

fastening means for securing said child's seat portion in said open position overlaying said bench; and harness means, extending between said seat portion and said back portion formed in said recess, for strapping in an occupant of said collapsible child's seat.

2. The collapsible child's seat of claim 1 wherein said restraint means is cylindrical in shape and in the non-engaged position thereof forms a portion of said upright back, the upper surface of the restraint means then being flush with the upper surface of the upright back of said vehicle bench seat.

3. The collapsible child's seat of claim 2 wherein said restraint means include a pair of extensible tubular arms, each of which is pivotally connected at one end thereof to said vehicle at opposite sides of said recess, and at the opposite ends thereof to a transversely extending rod member about which the padding of said padded restraint means is removably mounted.

4. The collapsible child's seat of claim 3 wherein said bracket means further include a brace means having a lockable flexible knuckle for maintaining said padded restraint means at a fixed predetermined distance above said seat portion.

5. The collapsible child's seat of claim 4 wherein said brace means are lockable to maintain said padded restraint means in the engaged position thereof.

6. The collapsible child's seat of claim 5 wherein said fastening means comprise a strap member securely fixed at one end thereof to said seat portion and to said vehicle at the other end thereof whereby said seat portion is securely maintained in the opened position overlaying said bench portion.

7. The collapsible child's seat of claim 6 wherein said seat portion includes an upper seating surface molded to conform generally to the shape of the seat occupant.

* * * * *